UNITED STATES PATENT OFFICE.

LEON McCULLOCH, OF WILKINSBURG, PENNSYLVANIA, ASSIGNOR TO WESTINGHOUSE ELECTRIC AND MANUFACTURING COMPANY, A CORPORATION OF PENNSYLVANIA.

CEMENT.

1,241,531.  Specification of Letters Patent.  Patented Oct. 2, 1917.

No Drawing.  Application filed January 7, 1914.  Serial No. 810,782.

*To all whom it may concern:*

Be it known that I, LEON McCULLOCH, a citizen of the United States, and a resident of Wilkinsburg, in the county of Allegheny and State of Pennsylvania, have invented a new and useful Improvement in Cement, of which the following is a specification.

My invention relates to cements and particularly to cements of the oxychlorid type, and it has for one of its objects such modification of known cements of this type as will render them suitable for purposes to which they have not heretofore been adapted.

Another object of my invention is to provide a method of controlling the setting behavior of cements which normally expand on setting.

My invention resides in the selection of ingredients and in the steps of the process by which such ingredients are combined.

Oxychlorid cements are ordinarily prepared by mixing an oxid of an alkali earth metal, such as magnesium oxid or calcium oxid, with a solution of the corresponding chlorid and incorporating in the mixture a suitable filler, such as marble dust. These cements are exceedingly strong and are employed for a wide variety of purposes. Their use, however, is limited by the fact that they expand considerably upon setting by reason of the crystallization of the oxychlorid ingredient, and they are therefore not available for cementing relatively fragile materials, such as porcelain. For example, these cements, if used in insulating supports and bushings for electrical construction, will frequently burst them, and this fact prohibits the use of the ordinary oxychlorid cements in this class of work, to which they are otherwise well suited.

I have found that this difficulty can be overcome by incorporating in the wet cement mixture a compound which dries with considerable shrinkage in volume. The shrinkage of this ingredient of the cement offsets, either wholly or in part, the expansion of the oxychlorid, and, by suitably balancing the proportions of the shrinking and the expanding ingredients of the cement mixture, a composition may be produced which will not expand at all, or which will even shrink on setting.

Among the substances which I may add to oxychlorid cements in order to correct their behavior on setting, I have found calcium saccharate to be very efficient. Other substances formed by reaction between alkalis and sugars are likewise suited to my purpose. However, I do not wish to be limited to the use of these substances since my invention comprehends broadly the use of any substance which contracts in volume upon drying.

The following is an example of the manner in which I may practise my invention, using proportions which give excellent results. All the parts specified are by weight.

I prepare a solution of magnesia chlorid and sugar by heating 54 parts of magnesium chlorid preferably the salt having the formula $MgCl_2.6H_2O$, and 9 parts of sugar in 34 parts of water.

I provide also a dry pulverulent mixture containing 48.5 parts of magnesium oxid, 73.5 parts of marble dust and 3.2 parts of air-slaked lime. The dry mixture and the solution are kept separate until the cement is to be used, when they are mixed in the cold in the proportions of 97 parts of the solution and 125.2 parts of the dry mixture. As will be readily understood, the lime and sugar present react to form calcium saccharate, thoroughly distributed in the cement. Any kind of sugar may be used within the scope of my invention, but at present I prefer to employ ordinary pulverized or granulated cane sugar.

The proportions stated produce a cement which contracts very slightly upon setting; which retains all the desirable properties of ordinary oxychlorid cements, and which makes a mixture of proper consistency for pouring into narrow cavities. The cement, when so used, sets in four or five hours sufficiently to be moved, although the setting is not complete for several days.

My cement is superior to ordinary oxychlorid cements for use in contact with fibrous material in that my cement mixture, in its liquid state, is of greater viscosity than ordinary cement mixtures, and, consequently, my cement does not penetrate into the surrounding fibrous material, as do cements which are prepared in the ordinary manner.

If desired, the process may be varied by first mixing the lime and sugar with about three-fifths of the water, dissolving the magnesium chlorid in the remainder of the water, and mixing the two liquids. In this modification of my process, the magnesium oxid and the marble dust are mixed in the dry state, and incorporated in the liquid when the cement is required for use.

It is to be understood that the procedure and the proportions of ingredients which I have mentioned, are merely illustrative. My invention is not confined to these steps and proportions, but is limited solely by the scope of the appended claims.

I claim as my invention:

1. A cement of the oxychlorid type which contracts on setting.

2. An oxychlorid cement containing a saccharate.

3. A cement of the oxychlorid type containing a substance formed by reaction between an alkali and a sugar.

4. A cement of the oxychlorid type containing calcium saccharate.

5. A cement composed of magnesium oxychlorid and calcium saccharate.

6. The process of making a cement which comprises adding a saccharate to a cement which normally expands on setting in sufficient quantity to prevent the resulting mass from expanding on setting.

7. The process of making a cement which comprises adding sugar and lime to a cement mixture of the oxychlorid type.

8. The process of making a cement which consists in making an aqueous solution of an alkaline earth metal chlorid and sugar, and incorporating therein a dry powder composed of an alkali earth metal oxid, a filler, and air-slaked lime, in sufficient quantity to form, upon setting, a firm cement.

In testimony whereof, I have hereunto subscribed my name this 31st day of December, 1913.

LEON McCULLOCH.

Witnesses:
PHILLIP THOMAS,
B. B. HINES.